United States Patent [19]

Vonasek

[11] Patent Number: 4,736,774

[45] Date of Patent: Apr. 12, 1988

[54] ELECTRO MECHANIC VALVE DEVICE

[75] Inventor: Jiri Vonasek, Kungälv, Sweden

[73] Assignee: Markpoint System AB, Goteborg, Sweden

[21] Appl. No.: 68,367

[22] Filed: Jul. 1, 1987

[30] Foreign Application Priority Data

Jul. 15, 1986 [SE] Sweden ................................ 8603123

[51] Int. Cl.[4] .......................... F16K 11/10; B41J 3/04

[52] U.S. Cl. .................................... 137/883; 335/267; 346/75

[58] Field of Search ................ 137/883, 884; 335/267; 346/75

[56] References Cited

U.S. PATENT DOCUMENTS 3,800,257 3/1974 Schmitt .......................... 335/267 X 4,210,919 7/1980 Aiba ...................................... 346/75

FOREIGN PATENT DOCUMENTS 7216692-9 11/1975 Sweden .

8440655-2 3/1986 Sweden .

*Primary Examiner*—A. Michael Chambers

*Assistant Examiner*—John C. Fox

*Attorney, Agent, or Firm*—Holman & Stern

[57] ABSTRACT

An electro mechanic valve device for an ink jet printer comprising at least two valves arranged in a valve housing. Each valve is associated with a magnet core having a winding and a valve pipe having a valve armature and a counter armature. The windings at adjacent magnet cores are arranged alternatingly, a first one at one side of the row of valve pipes and the next one at the opposite side.

3 Claims, 2 Drawing Sheets

ELECTRO MECHANIC VALVE DEVICE

FIELD OF THE INVENTION

The present invention relates to an electro mechanic valve device for an ink jet printer comprising at least two valves arranged in a valve housing where each valve is associated with a magnetic core having a winding and a valve pipe having a valve armature and a counter armature.

Electro mechanic valve devices of the type mentioned are used for instance in ink type printers having several valves, for instance seven valves, each one controlling one ink jet. The drawback with such valve devices is that they are space demanding because the windings of the magnet cores are arranged successively in a straight row.

OBJECT OF THE INVENTION

The object of the present invention is to provide an electro mechanic valve device which is less space demanding, i.e. which is more compact or has a larger packing density. Additionally, the object is to provide a structure which prevents gas-formation in ink channels within the printer by reducing the length of the ink channels. The short channel length does also mean a reduced clogging risk and a lower pressure drop in the ink system.

SUMMARY OF THE INVENTION

The valve device according to the invention is characterized in that the windings on adjacent magnet cores are arranged alternatingly on one of two sides relative the row of valve pipes, and that each valve armature extends into the printing ink containing chamber of the printer close to an ink outlet in the wall of the chamber.

In a preferred ,embodiment each valve armature is arranged for movement in the longitudinal direction of its valve pipe.

In one embodiment a front element of each valve armature acts as an ink outlet sealing member when the armature is in a no-printing position.

Figure 1:
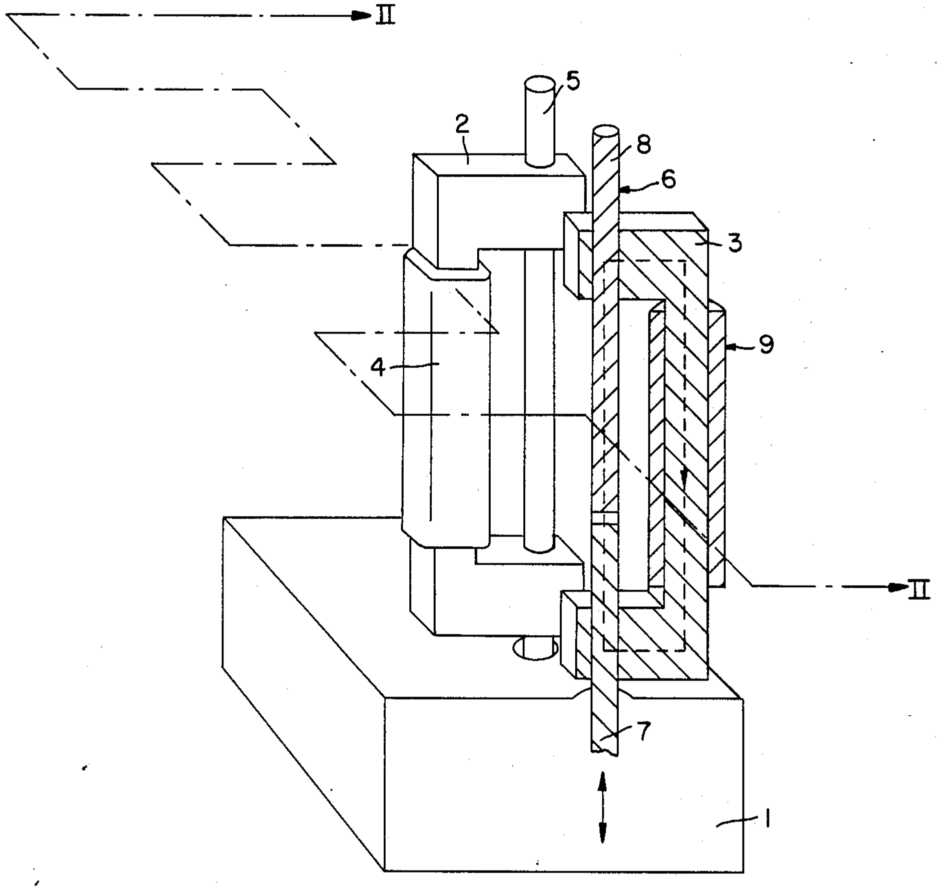
FIG. 1 schematically shows an embodiment of the invention having several valves, each one controlled by an electro mechanic device, one of which is shown in a perspective view and the other one in a perspective section view.

The valve device shown in FIG. 1 has a valve housing 1, on which are mounted two magnet cores 2 and 3, respectively, the latter one of which is cut longitudinally. The core 2 has a winding 4 and through the core there is guided a valve pipe 5. The core 3 has also a valve pipe 6, in which is arranged a moveable valve armature 7 and a counter armature 8. Around the core there is arranged a magnet winding 9. The valve pipe 5 has the same type of valve armature and counter armature as the valve pipe 6. As appears from FIG. 1, the windings 4 and 9, respectively, are arranged at opposite sides of a plane accommodating the valve pipes 5 and 6. The magnet windings do therefore define a zig-zag pattern, which means that the valve pipes and consequently the valve orifices may be arranged closer to each other giving a valve device which will be more compact. When using a valve device according to the present invention in an ink jet printer the number of valve pipes for instance may be seven pipes.

The set aside or lateral placement of the windings additionally means the advantage of a more efficient cooling of the windings. It is also possible to have a larger number of winding turns or a thicker winding on each coil in order to obtain a faster valve.

Figure 2:
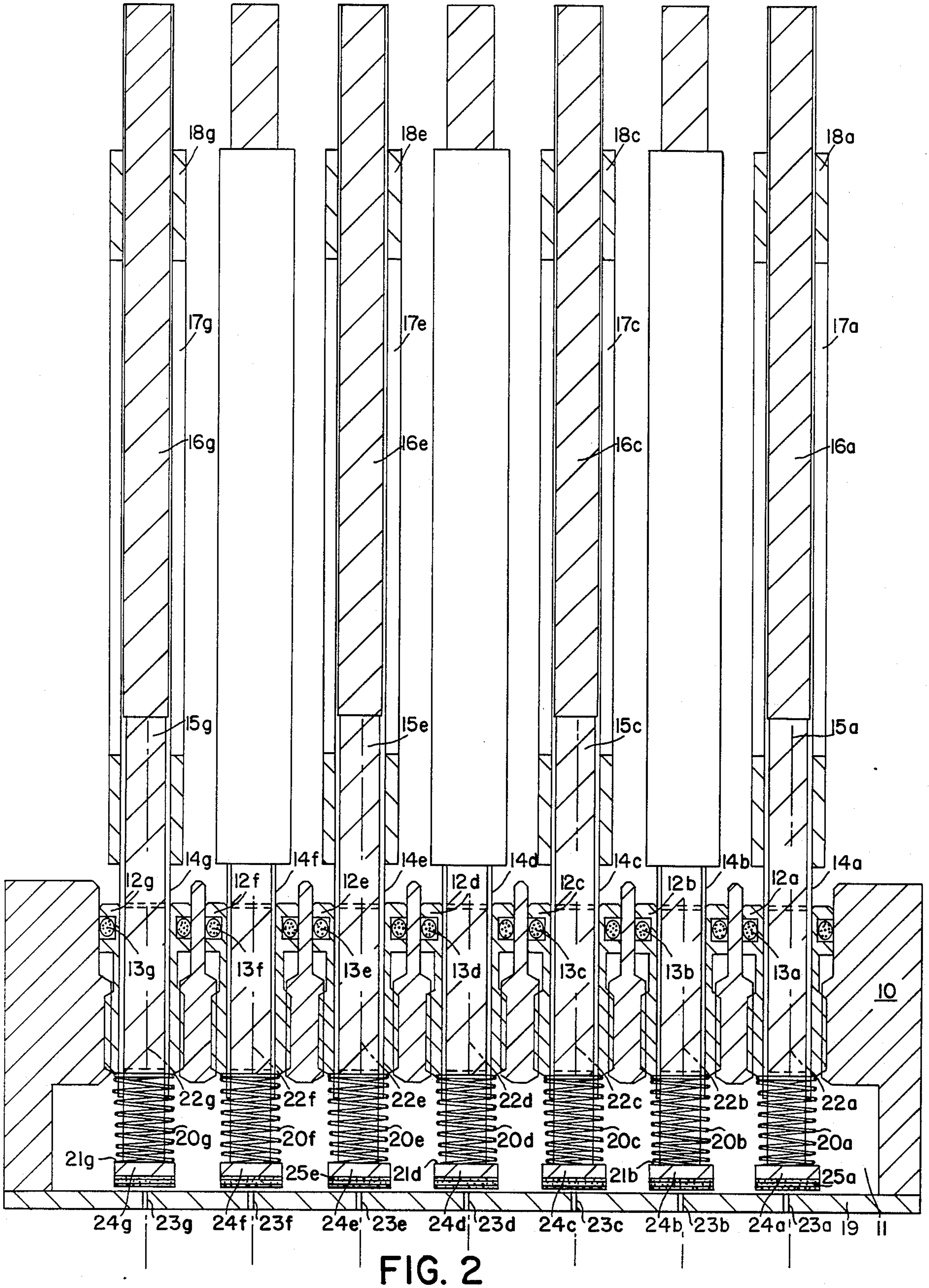
FIG. 2 is a section view and elevation view, respectively, of a printer head basically along line II—II in FIG. 1.

A seven valve pipe embodiment of a printer head or electro mechanic valve device according to the invention is shown in FIG. 2. The reference numeral 10 indicates a housing forming a printing ink chamber 11 filled by pressurized ink from a chamber inlet (not shown). Plugs 12*a–g* form guides for valve pipes 14*a–g* and are sealed against the housing 10 by sealing rings 13*a–g*.

The valve pipes encompass, with a small circumferential gap, valve armatures 22*a–g* which are spring biased, by springs 20*a–g* acting on armature shoulders, in a direction towards ink outlets 23*a–g* formed in an end plate 19 of the housing. There are end elements 25*a–g* on the valve armatures acting as sealing members when all, some or one of the armatures are/is in a state corresponding to the appropriate number of non-energized windings. The armature positions and end element positions in FIG. 1 correspond to a state where all seven windings 9 (not shown in FIG. 2) are energized and where pressurized ink escapes from all openings 23*a–g*.

The level of ink within the chamber 10 extends, within said circumferential gap, at a mamximum up to the lower end of elements 16*a–g* acting as counter armatures and guided by sleeves 18*a–g*, e.g. the element 8 in FIG. 1. The counter elements form a liquid tight seal at the top region of the valve pipes 14*a–g*. Each core 17*a–g* (the windings thereof are not shown in FIG. 2) corresponds to core 2 or 3 in FIG. 1.

As appears from the disclosure, the invention provides a compact, short ink channel ink jet printer head having the specific valve device described.

We claim:

1. I an electro mechanic valve device for an ink jet printer, comprising at least two valves arranged in a valve housing, where each valve is associated with a magnet core having a winding and a valve pipe having a valve armature and a counter armature, and where the valve pipes form a straight row, the improvement:

that the windings of adjacent magnet cores are arranged alternatingly, one at a first side and the next at the opposite side of the row of valve pipes, and that each valve armature extends into the printing ink containing chamber of the printer close to an ink outlet in the wall of the chamber.

2. Valve device as in claim 1, wherein each valve armature is arranged for movement in the longitudinal direction of its valve pipe.

3. Valve device as in claim 2, wherein a front element of each valve armature acts as an ink outlet sealing member when the armature is in a no-printing position.

* * * * *